US008583725B2

(12) United States Patent
Gibson

(10) Patent No.: US 8,583,725 B2
(45) Date of Patent: Nov. 12, 2013

(54) SOCIAL CONTEXT FOR INTER-MEDIA OBJECTS

(75) Inventor: Chad Gibson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 584 days.

(21) Appl. No.: 12/754,459

(22) Filed: Apr. 5, 2010

(65) Prior Publication Data

US 2011/0246560 A1 Oct. 6, 2011

(51) Int. Cl.
*G06F 15/16* (2006.01)

(52) U.S. Cl.
USPC ............ 709/203; 709/204; 715/700; 715/733

(58) Field of Classification Search
USPC ................ 709/203, 204; 707/732, 769, 748; 715/700, 727, 733
See application file for complete search history.

(56) References Cited

U.S. PATENT DOCUMENTS

| 6,169,573 | B1 | 1/2001 | Sampath-Kumar et al. |
| 7,480,442 | B2 | 1/2009 | Girgensohn et al. |
| 2007/0250775 | A1 | 10/2007 | Marsico et al. |
| 2008/0040474 | A1 | 2/2008 | Zuckerberg et al. |
| 2008/0317241 | A1* | 12/2008 | Wang et al. ............. 379/406.11 |
| 2009/0012937 | A1 | 1/2009 | Lee et al. |
| 2009/0082045 | A1* | 3/2009 | Mitchell et al. ............... 455/466 |
| 2009/0083260 | A1 | 3/2009 | Artom et al. |
| 2009/0083320 | A1 | 3/2009 | Adams et al. |
| 2010/0030578 | A1* | 2/2010 | Siddique et al. ................... 705/3 |
| 2010/0076968 | A1* | 3/2010 | Boyns et al. ................... 707/732 |
| 2010/0085363 | A1* | 4/2010 | Smith et al. ................... 345/473 |
| 2010/0274847 | A1* | 10/2010 | Anderson et al. ............. 709/203 |
| 2010/0292917 | A1* | 11/2010 | Emam et al. ................... 701/201 |
| 2010/0306249 | A1* | 12/2010 | Hill et al. ....................... 707/769 |
| 2011/0252340 | A1* | 10/2011 | Thomas ......................... 715/756 |
| 2012/0221581 | A1* | 8/2012 | Narayanan et al. ........... 707/748 |

FOREIGN PATENT DOCUMENTS

| JP | 2008191768 A | 8/2008 |
| JP | 2009157899 A | 7/2009 |
| KR | 1020090072575 A | 7/2009 |
| WO | 2007082167 A2 | 7/2007 |

OTHER PUBLICATIONS

Memon, et al., "Object-Database Approach for a Hypervideo Platform", Retrieved at <<http://eprints.ecs.soton.ac.uk/15654/1/article_malaysian_research_journal.pdf>>, Malaysian Journal of Computer Science, vol. 16 No. 2, Dec. 2003, pp. 73-80.

(Continued)

*Primary Examiner* — Thu Ha Nguyen
(74) *Attorney, Agent, or Firm* — Alleman Hall McCoy Russell & Tuttle LLP

(57) ABSTRACT

Embodiments are disclosed that relate to social context for inter-media objects. One embodiment provides a method comprising receiving preference data indicating user preferences of each of the plurality of socially networked users regarding the inter-media object, and aggregating the preference data across the social graph to form social graph aggregate data. The method further comprises providing the content item to a selected user of the plurality of socially networked users, and based upon a location of the selected user within the social graph, generating a selected set of the social graph aggregate data for the inter-media object from the social graph aggregate data for the selected user. The method further comprises providing to the selected user a representation of social context for the inter-media object based on the selected set of the social graph aggregate data.

19 Claims, 3 Drawing Sheets

(56) References Cited

OTHER PUBLICATIONS

Huet, et al., "Personalization of Hyperlinked Video in Interactive Television", Retrieved at <<http://ieeexplore.ieee.org//stamp/stamp.jsp?tp=&arnumber=01521460>>, IEEE International Conference on Multimedia and Expo, Jul. 6-8, 2005, pp. 4.

"Asterpix: hypervideo for all", Retrieved at <<http://3form.org/blog/?p=39=1>>, Jan. 11, 2010, pp. 2.

Aubert, et al., "Integration of Semantic Web Technology in an Annotation-based Hypervideo System ", Retrieved at <<http://www.image.ntua.gr/swamm2006/resources/paper02.pdf>>, in Workshop on Semantic Web Annotations for Multimedia, Jan. 11, 2010, pp. 15.

"International Search Report", Mailed Date: Dec. 7, 2011, Application No. PCT/US2011/030579, Filed Date: Mar. 30, 2011, pp. 8.

\* cited by examiner

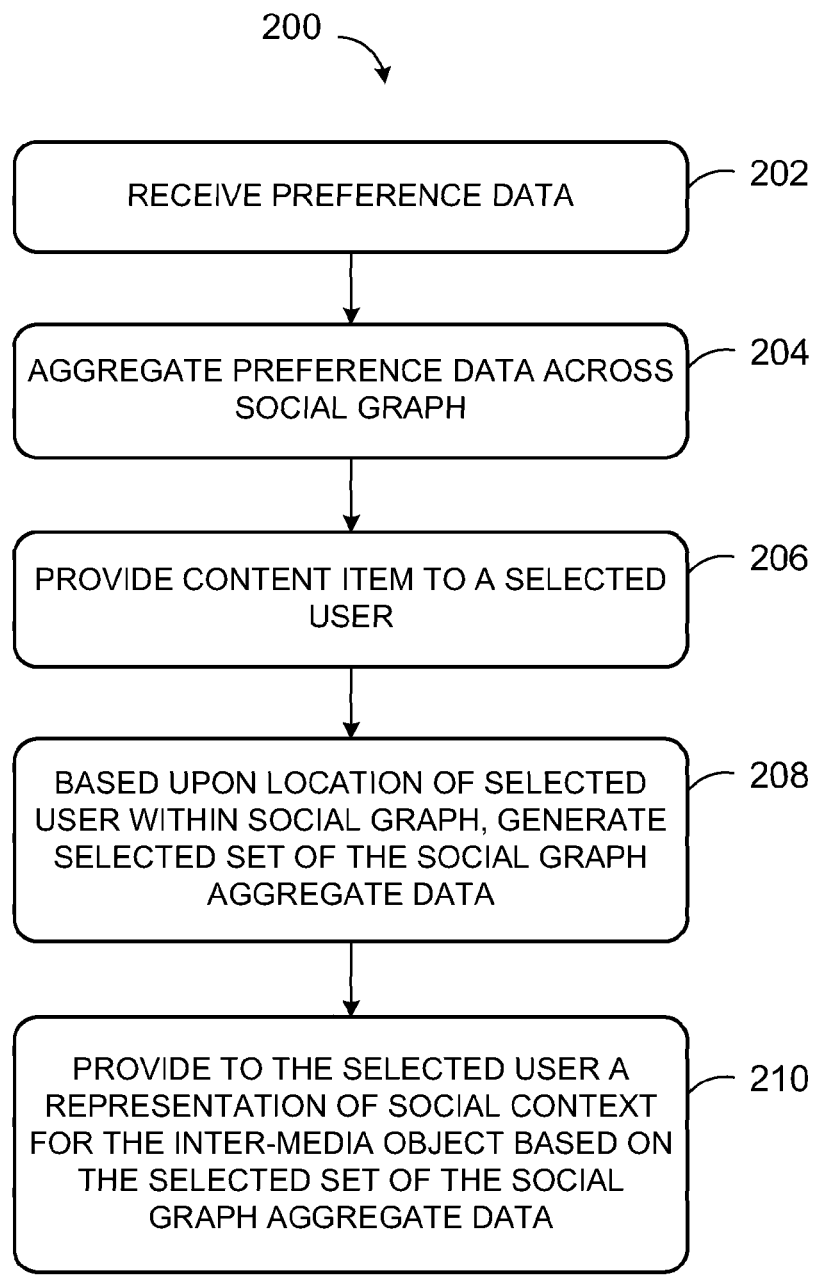

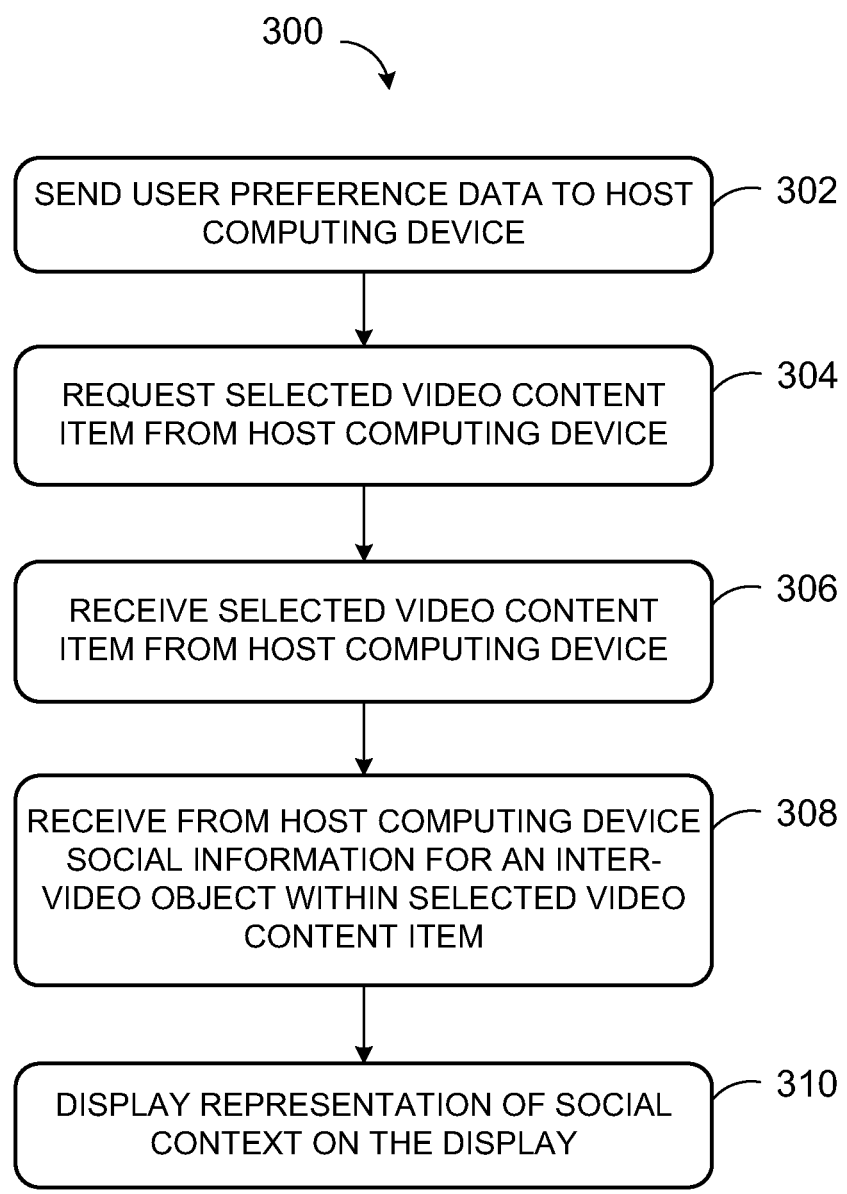

SOCIAL CONTEXT FOR INTER-MEDIA OBJECTS

BACKGROUND

Various hypervideo techniques have been developed to allow for tagging of objects within a video content item. For example, a user may annotate a video using a hypervideo authoring tool to manually add tags within the video. Hypervideo techniques may also be utilized, for example, to segment a video into pieces (e.g., into scenes). In addition to manual tagging, other approaches may be utilized to tag videos. As an example, another approach includes community-based tagging (e.g., crowd sourcing) wherein a group of several users provides tags for a video.

SUMMARY

Various embodiments are disclosed herein that relate to social context for inter-media objects. For example, one disclosed embodiment provides, in a computing device, a method of providing social context for an inter-media object occurring within an audio and/or video content item, where the content item is accessible by a plurality of socially networked users within a social graph. The method comprises receiving preference data indicating user preferences of each of the plurality of socially networked users regarding the inter-media object, and aggregating the preference data across the social graph to form social graph aggregate data. The method further comprises providing the content item to a selected user of the plurality of socially networked users. The method further comprises, based upon a location of the selected user within the social graph, generating a selected set of the social graph aggregate data for the inter-media object from the social graph aggregate data for the selected user. The method further comprises providing to the selected user a representation of social context for the inter-media object based on the selected set of the social graph aggregate data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a flow diagram of an example embodiment of a method of providing social context for an inter-media object occurring within an audio and/or video content item, in accordance with an embodiment of the present disclosure.

FIG. 3 shows a flow diagram of an example embodiment of a method of receiving social context for an inter-video object occurring within a video content item, in accordance with an embodiment of the present disclosure.

DETAILED DESCRIPTION

Figure 1:
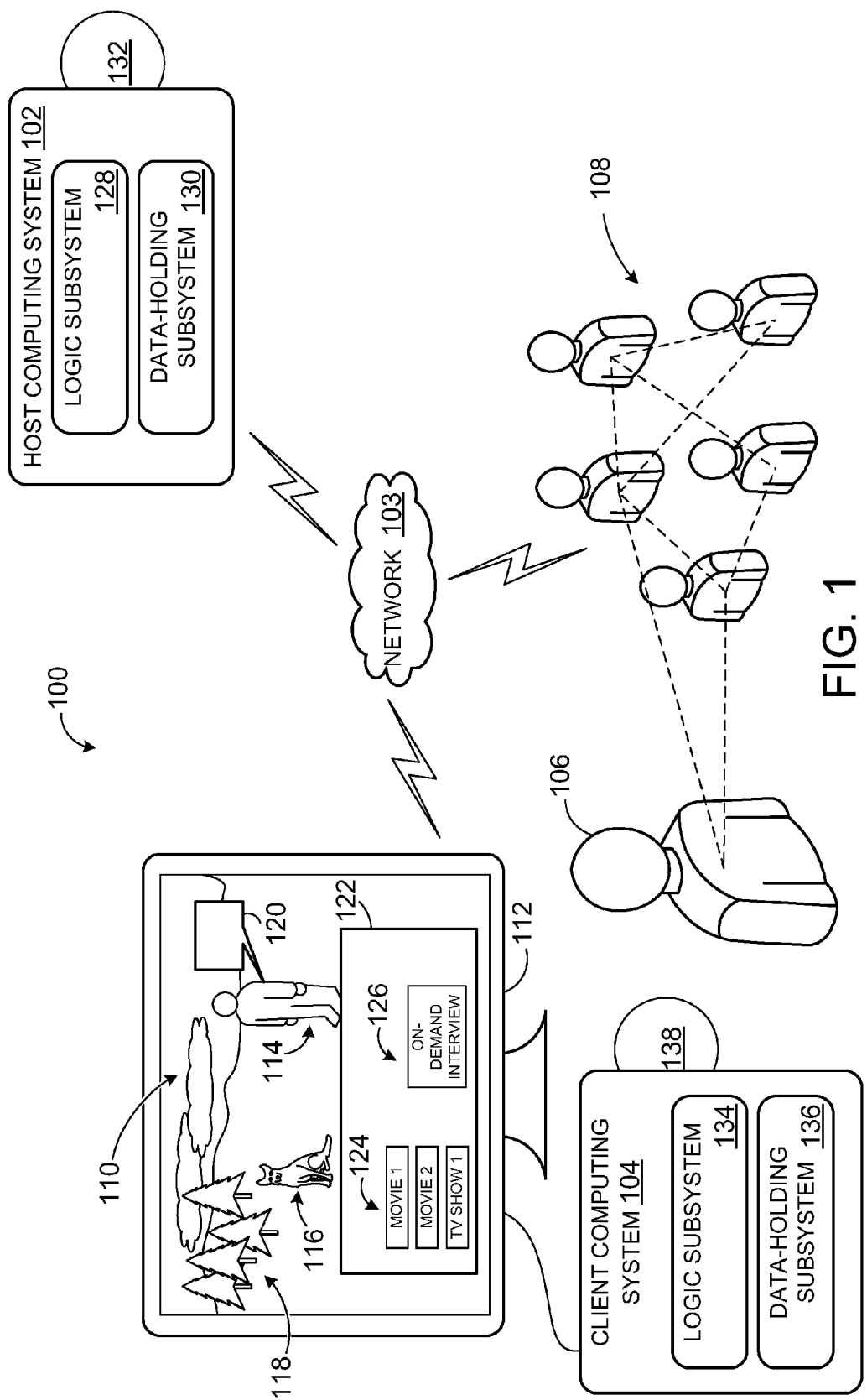
FIG. 1 shows a schematic depiction of an example use environment for implementing the provision and display of social context for an inter-media object, in accordance with an embodiment of the present disclosure.

Various hypervideo techniques have been developed to allow for tagging within a video content item, including manual tagging and community-based tagging, as introduced above. Another approach includes algorithmic tagging, wherein algorithms are applied to separate a video into algorithmically identifiable, taggable content. Such algorithmic tagging may provide for more efficient tagging. Further, various content recognition techniques may be used to identify objects variously occurring within a video, or "inter-video objects." For example, in the case of video content, inter-video objects are objects appearing on-screen, and include, but are not limited to, a character within a video content item, a physical object within a video content item, a location within a video content item, an actor or character within a video content item, etc. Further, applications of such object detection and tagging may be extended to other types of media, such as audio. In other words, more generally, hypermedia techniques can be utilized to identify "inter-media objects" variously occurring within a content item, and such inter-media objects may be hyperlinked to enable a richer user experience than conventional video. Social context for inter-media objects as disclosed herein provides social context not just for a content item itself, but for the inter-media objects within the content item, wherein the social context is based on a user's social graph. As such, providing social context for inter-media objects may facilitate discovery of relevant objects discovered and played across multiple videos by various users, thus enhancing a user's experience, as described in more detail as follows.

It is becoming increasingly more common for a media user to be socially networked via a computer network to other people, such as a group of friends, a group of co-workers, a group of community members, etc. By being part of a social graph, the user might find it more convenient, for example, to contact and communicate with friends, and stay abreast of friends' actions, activities, likes, dislikes, etc. A social graph facilitates spreading explicit information that a user chooses to make available, for example via postings on a profile page. Further, user activity on a computing device may be analyzed over the social graph to provide information implicit in such activity to a user. For example, if a user is listening to a song on their computer, the user may be notified that a friend within their social graph has indicated that this particular song is their favorite song. As another example, if a user is watching a movie on their computer, the user may be notified that this particular movie is the most-watched movie within their social graph. Social context for inter-media objects as disclosed herein thus provides social context not just for a content item itself, but for the inter-media objects within the content item. It will be understood that a user may be provided with such sharing and information analysis capabilities on an opt-in basis, and that a user may choose to maintain his or her activities private as a default setting.

As a more specific example, social context for inter-media objects may be utilized in the following example use scenario. A user flipping through channels may stop on an episode of a television show, and after watching a few minutes of a re-run, notice that an actor has a special icon flashing above his head indicating that the user's friend is currently watching that actor in a movie on another channel. As such, the user may decide to join his friend and watch the movie with him. As another example use scenario, a user may be watching an episode of a television show and discover that one of the characters is her friend's favorite by special notifications popping up on the screen with this information. It will be appreciated that these specific uses are presented for the purpose of example, and are not intended to be limiting in any manner.

FIG. 1 shows an example use environment 100, including a host computing device 102 configured to provide content items (e.g., audio content items, video content items, etc.) to various client computing devices via a network 103. For example, host computing device 102 may provide a content item(s) to an example client computing device 104 and a selected user 106 of computing device 104. Host computing device 102 may also provide content items to one or more other client computing devices. As an example, selected user 106 may be socially networked to other users within a social graph via network 103, such as depicted at 108. As such, host computing device 102 may be configured to provide content items to computing devices corresponding to the other users within the social graph 108.

In addition to providing content items, host computing device 102 may be further configured to provide social context for an inter-media object occurring within an audio content item, video content item, etc. As an example, for the case of a video content item, an inter-video object may be an actor appearing at various times during the video content item. As another example, the inter-video object may be a location or setting appearing within the video content item. As yet another example, the inter-video object may be a physical object displayed during the video content item, such as an animal, a building, a commercial product placement, etc. In the depicted example, host computing device 102 has provided a video content item 110 to client computing device 104 for display via display subsystem 112 of client computing device 104. Examples of inter-video objects shown for video content item include a person 114, a dog 116 and a location 118. It can be appreciated that such examples of inter-video objects are nonlimiting, and virtually any other such object of the video content item may be additionally or alternatively identified.

The social context for an inter-media object comprises social information about the inter-media object based on user preferences of selected user 106 and other users within social graph 108. As such, by providing social context to selected user 106, selected user 106 may discover additional information based on preferences of various users within the user's social graph 108. For example, a representation of social context may include statistics about user preferences of the other users within the social graph to the inter-video object (e.g., identify a particular actor as one of the most-watched actors by the user's friends in the social graph; identify that the user's friend likes or doesn't like a particular actor, etc.). As another example, a representation of social context may include suggested video content related to the inter-video object (e.g., a suggested television show, movie, on-demand actor interview, etc.).

In some embodiments, representations of social context may appear during playback (e.g., pop up during an on-screen appearance of the inter-video object, appear in a side-menu, etc.). For example, FIG. 1 depicts an example representation of social context 120 displayed by an inter-video object, namely person 114. It can be appreciated that social context 120 is nonlimiting, and social context may be provided in virtually any other suitable manner.

Further, in some embodiments, representations of social context may appear within a user interface providing a programming guide by which a user can access/request content (e.g., a discovery menu). For example, the representation of social context may include a discovery result within a content discovery user interface functionality, and may, for example, provide an entry point(s) to user-selectable video content suggested to the user based on the user preferences of socially networked users within the social graph. As an example, FIG. 1 shows a discovery menu 122 within which example representations of social context 124 and 126 are displayed. In the depicted example, social context 124 includes a movie and two television shows, whereas social context 126 includes an on-demand actor interview.

Continuing with FIG. 1, host computing device 102 includes a logic subsystem 128 and a data-holding subsystem 130. Host computing device 102 may further be configured to read a computer-readable removable media 132, which may be used to store and/or transfer data and/or instructions executable to implement the herein described embodiments. Host computing device 102 may further include various other components not shown in FIG. 1.

Logic subsystem 128 may include one or more physical devices configured to execute one or more instructions, such as a method of providing social context for an inter-media object occurring within an audio and/or video content item, as described in more detail hereafter with reference to FIG. 2. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 130 may include one or more physical, non-transitory, devices configured to hold data and/or instructions executable by the logic subsystem to implement the herein described methods and processes. When such methods and processes are implemented, the state of data-holding subsystem 130 may be transformed (e.g., to hold different data). Data-holding subsystem 130 may include removable media and/or built-in devices. Data-holding subsystem 130 may include optical memory devices, semiconductor memory devices, and/or magnetic memory devices, among others. Data-holding subsystem 130 may include devices with one or more of the following characteristics: volatile, nonvolatile, dynamic, static, read/write, read-only, random access, sequential access, location addressable, file addressable, and content addressable. In some embodiments, logic subsystem 128 and data-holding subsystem 130 may be integrated into one or more common devices, such as an application specific integrated circuit or a system on a chip.

Example client computing device 104 also comprises a logic subsystem 134, a data-holding subsystem 136, and the previously mentioned display subsystem 112. Client computing device 104 further may optionally include computer-readable removable media 138 and/or other components not shown in FIG. 1. Logic subsystem 134 of client computing device 104 may include one or more physical devices configured to execute one or more instructions, such as a method of receiving social context for an inter-video object occurring within a video content item, as described in more detail hereafter with reference to FIG. 3.

Display subsystem 112 may be used to present a visual representation of data held by data-holding subsystem 136. As the herein described methods and processes change the data held by the data-holding subsystem, and thus transform the state of the data-holding subsystem, the state of display subsystem 112 may likewise be transformed to visually represent changes in the underlying data. Display subsystem 112 may include one or more display devices utilizing virtually any type of technology. Such display devices may be combined with logic subsystem 134 and/or data-holding subsystem 136 in a shared enclosure, or such display devices may be peripheral display devices.

Turning now to FIG. 2, FIG. 2 shows a flow diagram depicting an example embodiment of a method 200 of providing social context for an inter-media object occurring within an audio and/or video content item. Such a method may be executed, for example, by host computing device 102. The content item may be accessible by a plurality of socially networked users within a social graph, such as, for example, a user and the user's friends.

At 202, method 200 includes receiving preference data indicating user preferences of each of the plurality of socially networked users regarding the inter-media object. The preference data may include preference data for each of the plurality of socially networked users within the social graph. For example, using the concepts of hypervideo, a video content item can be broken down into objects displayed at various times within the video, and preference data may be generated for the media content item itself (e.g., actor A is displayed at the following time intervals during episode X; city B is the location of episode Y, etc.).

In some embodiments, the preference data may include implicit data based on media-related user behavior collected for that socially networked user. Such implicit user preference data may include information for a video episode (e.g., user X played episode Y), for example, as well as information about specific objects displayed within the video (e.g., user X watched episode Y, which included character A for Z minutes). Further, in some cases, implicit user behavior may include detected actions such as user-selected navigation during programming when a particular inter-video object is on-screen (e.g., pausing, rewinding, fast-forwarding, etc.). Implicit user behavior also may include input from other input devices. For example, where a client system includes a motion-sensing camera, implicit user behavior may include user behaviors/body language during which the user elicits a particular response (e.g., laughing) when a particular inter-video object is on-screen, etc.

Further, in some embodiments, the preference data may include explicit data indicating user-defined preferences provided by that socially networked user (e.g., most-watched actor, least-watched actor, favorite actor, favorite character, top-rated location, etc.). In other words, user preference data may include information for a movie (e.g., user X played movie Y), for example, and also data about specific objects (e.g., characters) displayed within the movie (e.g., user X has rated character A as a "favorite").

In some embodiments, in addition to receiving such preference data, method 200 may further include collecting such preference data. Accordingly, collecting the preference data may include obtaining explicit data (e.g., user-defined data) provided by the users. Additionally or alternatively, collecting the preference data may include recognizing/analyzing user media behaviors, collecting preference data via inter-video object recognition and facial recognition, etc. Object and/or facial recognition techniques may utilize any suitable technology. For example, with regard to facial recognition, techniques may be utilized to identify faces, identify perspectives of faces (e.g., looking forward, looking to the side, etc.), etc. With that data, a "face forward image" of the face may be generated, and facial recognition techniques may then be applied to that image to determine the identity of the face. Upon doing so, the face can then be tracked in the video. It can be appreciated this is just one of many suitable approaches to facial recognition within video content items, and that various other suitable techniques may be utilized without departing from the scope of this disclosure.

In some embodiments, preference data may be collected via an algorithmic approach, which can generate metadata per frame, or "time-based metadata," on the video itself. As an example, faces may be identified on the screen during watching of a television show, movie, etc. over the course of a duration (e.g., one month). An algorithm may then be utilized to determine, for example "what actors you watch the most." Examples of algorithms include, but are not limited to, most-watched actor (e.g., derived by total viewing minutes), most-watched actor (e.g., derived by most unique shows watched with a specified actor), actor that caused the most laughter, etc. In other embodiments, preference data may be collected via a manual approach based on community-based tagging (e.g., crowd-sourcing).

By receiving preference data indicating users' preferences to the inter-media object, usage aggregates can be applied at a more granular level, namely to the inter-media objects themselves. As an example, it may be determined that user X watched character A for a total of Z minutes. As another example, it may be determined that user X has five favorite characters. As yet another example, whereas traditional metadata for a cast-listing may not indicate the duration of an actor's performance within the video content item, preference data indicating users' preferences to the inter-media object can provide a weighted-relevance of the time a particular actor appeared in the movie. As such, social context including suggested content for the inter-video object, as described in more detail hereafter with reference to 210, can include content where the actor has a time-significant appearance, as opposed to a mere cameo appearance.

Continuing with FIG. 2, at 204, method 200 includes aggregating the preference data across the social graph to form social graph aggregate data. At 206, method 200 includes providing the content item (e.g., an episode of a television show, on-demand programming, a movie, etc.) to a selected user of the plurality of socially networked users. In some embodiments, the content item may be provided in response to receiving a request from a client computing device for a selected video, for example.

At 208, method 200 includes, based upon a location of the selected user within the social graph, generating a selected set of the social graph aggregate data for the inter-media object from the social graph aggregate data for the selected user (e.g., Character A is the most watched by the user's friends). As another example, the selected set of social graph aggregate data for the inter-media object may indicate top inter-video objects across a set of users and their respective socials graphs (e.g., most watched actors by the user's friends).

At 210, method 200 includes providing, to the selected user, a representation of social context for the inter-media object based on the selected set of the social graph aggregate data. In other words, display and communication of social context specific to objects within the video transmission may be provided. In some embodiments, the representation of social context for the inter-media object is provided to the selected user for display during an on-screen appearance of the inter-media object. In other words, a visual metaphor may be provided on and/or near a visual object while the user is watching the visual object on screen (e.g., "this actor is the most viewed by friend X or Y," "user X does not like this actor," etc.) Further, in some embodiments, providing the social context may include recognizing the inter-video object during playback of a video content item, and in response, displaying social context of the inter-video object during playback. For example, upon recognizing character A in a scene of a video, social context can be displayed indicating that this character is the user's friend Z's favorite character. Further, displaying social context during playback may include determining a location of the inter-video object on-screen (e.g. x,y coordinates), determining a temporal location of the inter-video object on-screen within the video content item, etc. in order to insert a visual indication of the social context accordingly.

Further, in some embodiments, the inter-media object may be provided to the selected user as a discovery result within a discovery menu. For example, the discovery menu may be a programming guide through which the user requests/accesses programming. In such a case, the discovery result may provide one or more entry points to user-selectable video content suggested to the selected user based on the selected set of the social graph aggregate data. For example, if the inter-video object is an actor, the discovery result may include other movies, television shows, etc. that include the actor, which the user may then request to view. As another example, the inter-video object may be a character from a television show, and the discovery result may include other cross-over television shows which the character appeared in, a movie which the character appeared in, etc., which the user may then request to view. As such, discovery results in the discovery menu may provide an alternative to a time-based programming guide, in that a user can discover aspects of content that may be relevant to them. For example, a user may view a list of top characters that their friends watch, and this list may also provide an entry point to watch a television episode or movie with that actor. Or, based on explicit collection of a user's favorite actor, the discovery result may include options of available shows having that actor.

Method 200 may be utilized within the context of plural video content items. For example, the aforementioned video content item may be a first video content item provided to the client computing device. The host computing device may then be further configured to, for example, receive a second request from the client computing device for a second selected video content item, send the second selected video content item to the client computing device, and then recognize a presence of the inter-video object in the second selected video content item. The host computing device may then send, to the client computing device, another representation of social context for the inter-video object.

Further, method 200 may optionally be utilized within the context of plural computing devices. For example, the aforementioned video content item may be a first video content item provided to a first client computing device. The host computing device may then be further configured to, for example, receive a second request from a second client computing device for a second selected video content item, where the second computing device is associated with another of the one or more users socially networked within the social graph. The host computing device may then send the second selected video content item to the second client computing device, recognize a presence of the first inter-video object in the second selected video content item, and send to the second client computing device a representation of social context for the first inter-video object.

Turning now to FIG. 3, FIG. 3 shows a flow diagram depicting an example embodiment of a method 300 of receiving social context for an inter-media object occurring within an audio and/or video content item. Such a method may be executed, for example, by client computing device 104. At 302, method 300 includes sending user preference data to a host computing device, where the user preference data indicates preferences of a user regarding a plurality of inter-video objects. Each inter-video object may be an object displayed within a video content item (e.g., character, object, location, etc.). Further, the user may be socially networked to other users within a social graph. As introduced above, preference data may include explicit data indicating user-defined preferences provided by the user and/or implicit data based on media-related user behavior collected for the user.

At 304, method 300 includes requesting a selected video content item from the host computing device. The selected video content item may be an episode of a television show, a movie, a sports game, on-demand programming, etc.

At 306, method 300 includes receiving the selected video content item from the host computing device. This may include, for example, displaying the selected video content item on a display of the client computing device.

At 308, method 300 includes receiving from the host computing device a representation of social context regarding preferences of the other users within the social graph to an inter-video object within the selected video content item. The representation of social context may be based on an aggregation of the user preference data and preference data acquired by the host computing device from the other users within the social graph. In other words, other client computing devices may have also sent preference data to the host computing device, such that the preference data acquired by the host computing device includes preferences of the user as well as preferences of other users within the user's social graph.

At 310, method 300 includes displaying the representation of social context on the display. As described above, the representation of social context may include any sort of social context related to the inter-video object. For example, the representation of social context may include statistics about user preferences of the other users within the social graph to the inter-video object, suggested video content related to the inter-video object, and the like. Further, in some embodiments the representation of social context may be displayed during a presence of the inter-video object on screen. However, in some embodiments, the representation of social context may be displayed in a discovery menu (e.g., a programming guide).

As a possible use scenario, during viewing of an episode of the television show Lost, hypervideo techniques (e.g., facial recognition) may be applied to determine a particular character of the episode that the user prefers to watch. The user may then be provided with, for example, clips of the episode having that character on screen. As another example, a user may pause the show, click on a character, and then view other shows including the actor who plays that character.

Further, in the case of the inter-media object being an audio content item, inter-audio objects may include objects within the music, such as instruments, vocals, etc. As a possible use scenario, a user may listen to portions of different songs, such that the preference data indicates a certain preference to guitar solos performed by a Musician X. As such, it may be determined that several other users within the user's social graph also like guitar solos performed by Musician X, and the user may be provided with suggested content which contains other guitar solos by Musician X.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of providing social context for an inter-video object occurring within video content item, the content item being accessible by a plurality of socially networked users within a social graph, the method comprising:
   receiving preference data indicating user preferences of each of the plurality of socially networked users regarding the inter-video object within the content item;
   aggregating the preference data across the social graph to form social graph aggregate data;
   providing the content item to a selected user of the plurality of socially networked users;
   based upon a location of the selected user within the social graph, generating a selected set of the social graph aggregate data for the inter-video object from the social graph aggregate data for the selected user;
   providing to the selected user a representation of social context for the inter-video object based on the selected set of the social graph aggregate data; and
   recognizing the inter-video object during playback of the video content item, and in response, displaying the representation of social context of the inter-video object during playback.

2. The method of claim 1, wherein the representation of social context for the inter-video object is provided to the selected user for display during an on-screen appearance of the inter-video object.

3. The method of claim 1, wherein the representation of social context for the inter-video object is provided to the selected user as a discovery result within a discovery menu, the discovery result providing one or more entry points to user-selectable video content suggested to the selected user based on the selected set of the social graph aggregate data.

4. The method of claim 1, wherein the representation of social context for the inter-video object includes statistics about user preferences of one or more of the plurality of socially networked users within the social graph to the inter-video object.

5. The method of claim 1, wherein the preference data includes, for each of the plurality of socially networked users within the social graph, explicit data indicating user-defined preferences provided by that socially networked user.

6. The method of claim 1, wherein the preference data includes, for each of the plurality of socially networked users within the social graph, implicit data based on media-related user behavior collected for that socially networked user.

7. The method of claim 1, further comprising collecting the preference data via inter-video object recognition and facial recognition.

8. The method of claim 1, further comprising collecting the preference data via a manual approach based on community-based tagging.

9. The method of claim 1, wherein the inter-video object comprises one of a character within a video content item, a physical object within a video content item, and a location within a video content item.

10. In a computing device, a method of providing social context for an inter-video object occurring within a video content item, the method comprising:
    receiving from one or more users preference data indicating user preferences of the one or more users regarding a plurality of inter-video objects, each inter-video object being an object displayed within a video content item, and each of the one or more users being socially networked within a social graph;
    aggregating the preference data across the social graph to form social graph aggregate data;
    receiving a request from a client computing device for a selected video content item;
    sending the selected video content item to the client computing device;
    recognizing a presence of a first inter-video object in the selected video content item during playback of the video content item;
    generating a selected set of the social graph aggregate data corresponding to the first inter-video object from the social graph aggregate data; and
    sending to the client computing device a representation of social context for the first inter-video object based on the selected set of the social graph aggregate data for display during an on-screen appearance of the first inter-video object.

11. The method of claim 10, further comprising receiving a second request from the client computing device for a second selected video content item; sending the second selected video content item to the client computing device; recognizing a presence of the first inter-video object in the second selected video content item, and sending to the client computing device a representation of social context for the first inter-video object.

12. The method of claim 10, further comprising receiving a second request from a second client computing device for a second selected video content item, the second client computing device associated with another of the one or more users socially networked within the social graph; sending the second selected video content item to the second client computing device; recognizing a presence of the first inter-video object in the second selected video content item, and sending to the second client computing device a representation of social context for the first inter-video object.

13. The method of claim 10, wherein the first inter-video object is one of a character within the selected video content item, a physical object within the selected video content item, and a location within the selected video content item.

14. A client computing device, comprising:
    a display;
    a logic subsystem configured to execute instructions; and
    a data-holding subsystem holding instructions executable by the logic subsystem to:
      send user preference data to a host computing device, the user preference data indicating preferences of a user regarding a plurality of inter-video objects, each inter-video object being an object displayed within a video content item, and the user being socially networked to other users within a social graph;
      request a selected video content item from the host computing device;
      receive the selected video content item from the host computing device;
      receive from the host computing device a representation of social context regarding preferences of the other users within the social graph to an inter-video object within the selected video content item, the representation of social context based on an aggregation of the user preference data and preference data acquired by the host computing device from the other users within the social graph, the inter-video object recognized during playback of the video content item; and display the representation of social context on the display during playback of the video content item.

15. The client computing device of claim 14, wherein the user preference data includes explicit data indicating user-defined preferences provided by the user.

16. The client computing device of claim 14, wherein the user preference data includes implicit data based on media-related user behavior collected for the user.

17. The client computing device of claim 14, wherein the preference data acquired by the host computing device from other users within the social graph includes one or more of explicit data indicating user-defined preferences provided by the other users within the social graph and implicit data based on media-related user behavior collected for the other users within the social graph.

18. The client computing device of claim 14, wherein the representation of social context includes statistics about user preferences of the other users within the social graph to the inter-video object.

19. The client computing device of claim 14, wherein the representation of social context includes suggested video content related to the inter-video object.

* * * * *